United States Patent
Knapp

[15] 3,665,944
[45] May 30, 1972

[54] BUG HOUSE
[72] Inventor: Max C. Knapp, 23529 Lake Manor Dr., Chatsworth, Calif. 91311
[22] Filed: Dec. 2, 1970
[21] Appl. No.: 94,506

[52] U.S. Cl. ............................................. 135/1 R, 135/5 B
[51] Int. Cl. .............................................................. A45f 1/00
[58] Field of Search ................................. 135/1 R, 5 R, 5 B

[56] References Cited

UNITED STATES PATENTS 3,570,507  3/1971  Kashuba ................................. 135/1 R
2,936,771  5/1960  Marchfield et al. ..................... 135/5 R
2,594,410  4/1952  Feldpausch ............................. 135/5 B Primary Examiner—Peter M. Caun

[57] ABSTRACT

An out of doors enclosure for keeping out insects, the device comprising a framework of horizontal rings and vertical pipes there between so to support a netting fitted there around, the lowermost ring being held in position by means of spikes driven into the ground, and the framework being readily collapsable so that the device can be conveniently transported.

1 Claims, 4 Drawing Figures

Patented May 30, 1972 3,665,944

2 Sheets-Sheet 1

INVENTOR.
Max C. Knapp

INVENTOR.
Max C. Knapp

BUG HOUSE

This invention relates generally to insect proof enclosures.

A principal object of the present invention is to provide an insect proof enclosure for use out of doors such as may be used by campers, fishermen and others and which will serve to exclude insects from there within.

Another object of the present invention is to provide an insect excluding enclosure which includes a canopy of netting material that is supported upon a collapsable framework so that the device when not in use can be readily folded up and transported out of doors.

Yet another object of the present invention is to provide an insect excluding enclosure which accordingly when not in use can be stored away in a minimum amount of space.

Still another object of the present invention is to provide an insect excluding enclosure which may be made in any shape and size so as to accommomodate one or several persons out of doors and which accordingly is particularly suitable for use by scouts, campers, and other persons.

Other objects of the present invention are to provide an insect excluding enclosure which is simple in design, inexpensive to manufacture, rugged in construction, easy to use and efficient in operation.

Figure 1:
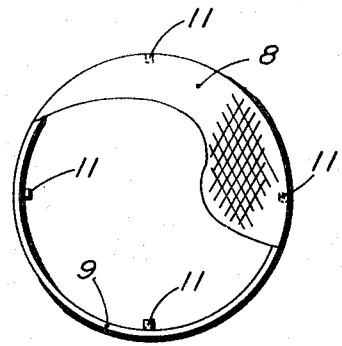
Figure 2:
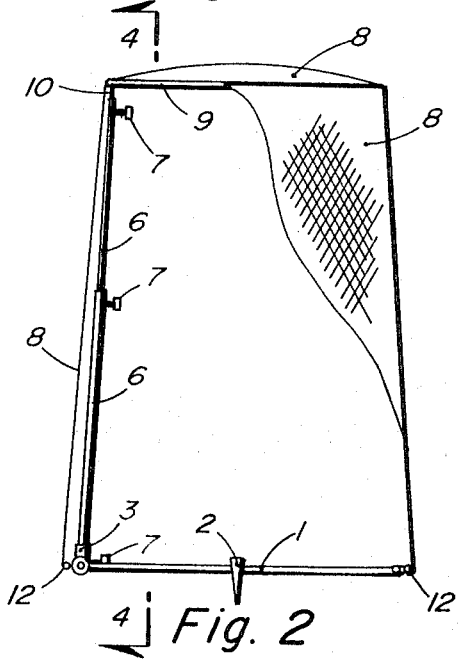
Figure 3:
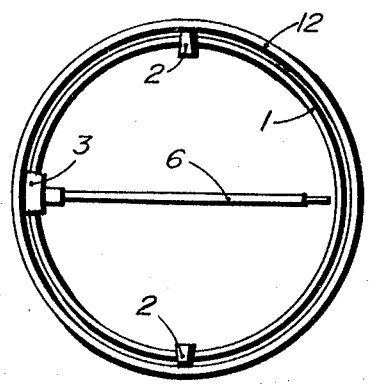
Figure 4:
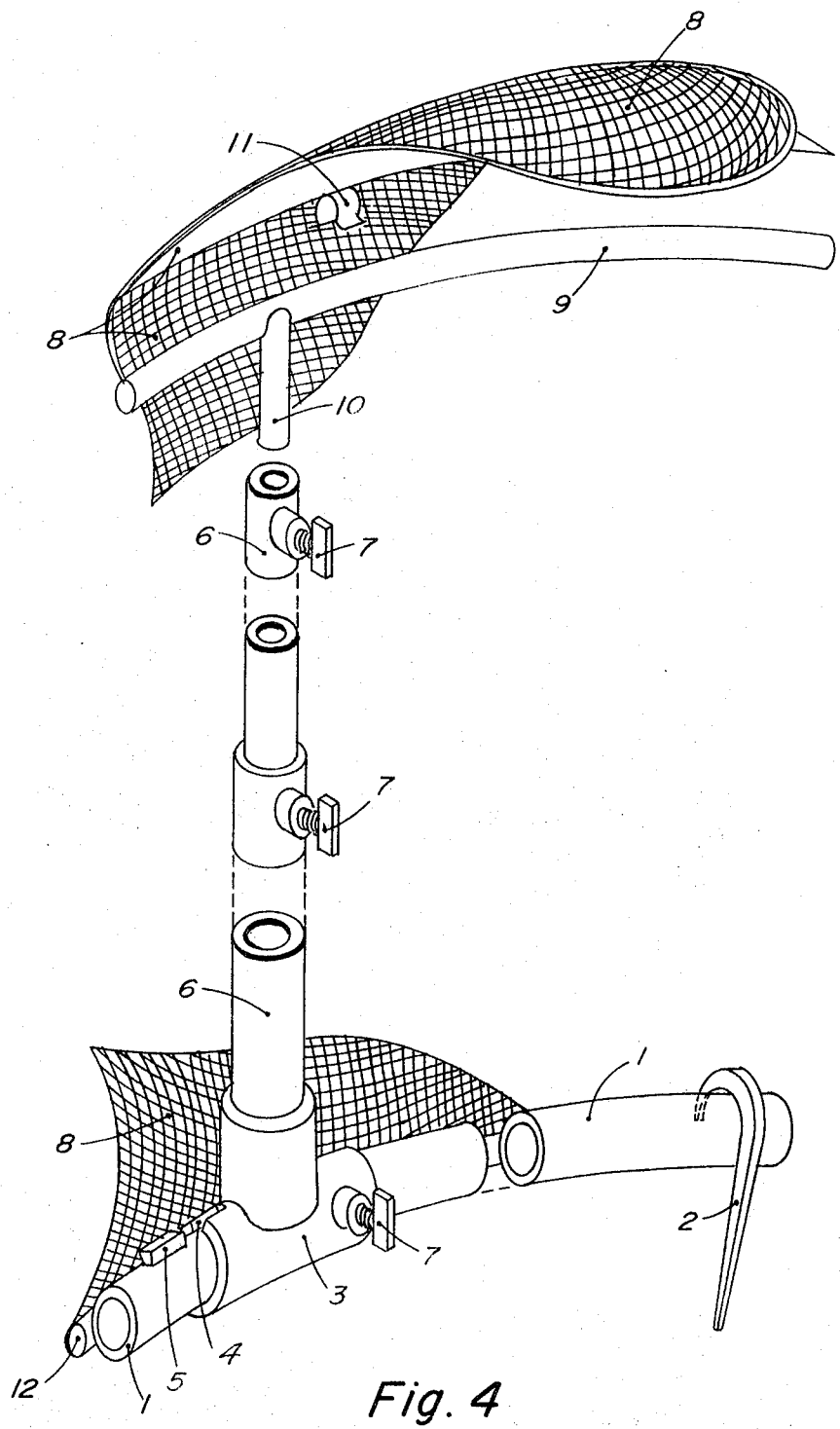

These and other objects will be readily evident upon a study of the following specification and the accompanying drawings wherein:

FIG. 1 is a top plan view of the present invention shown partly in cross section, FIG. 2 is a side elevation view thereof shown partly in cross section, FIG. 3 is a bottom plan view thereof showing the framework in a collapsed position, and FIG. 4 is a fragmentary enlarged perspective view of the assembly.

Referring now to the drawings in detail, the reference numeral 1 refers to a base ring which is adaptable for being positioned adjacent a ground upon which the enclosure is intended to be erected.

The base ring is made of steel pipe that is formed into a continuous ring, the ring 1 having a pair of diametrically opposite positioned tie down spikes 2 used for securing the base ring 1 in a fixed position upon a ground by driving the spikes 2 into the ground.

The spikes 2 at their upper ends each includes a semi-circular hook that fits over the upper side of the base ring, such as is best shown in FIG. 4.

A tee or bushing 3 is fitted on the base ring 1 and is freely rotatable there around. A groove 4 is formed along one end edge of the bushing 3, the groove 4 being adaptable for receiving a stop key 5 that is rigidly welded or otherwise secured upon the outer side of the ring 1 so that the bushing can thus be maintained in a fixed position and prevented selectively from rotating around the base ring 1.

An adjustably telescopic steel pipe 6 is welded to the tee or busing 3, as shown in FIG. 4, the steel pipe 6 being made of several pipe sections which are telescopic into each other and are selectively secured in position by means of winged set screws 7.

Additionally it should be noted that the bushing 3 is likewise provided with a winged set screw 7 for additionally securing the bushing from rotating about the base ring 1 particularly when the device is in a collapsed position such as is shown in FIG. 3 of the drawing, so that the device may be conveniently transported.

In order to support a plastic netting 8 upon a framework described there below, the upper end of the steel pipe 6 supports a top ring 9 which at one end has a downwardly extending plug 10 which is welded to the top ring 9.

The lower end of the steel plug 10 is receivable into the upper end of the uppermost steel pipe section 6 as is clearly shown in FIG. 4.

Four clips 11 are secured to the underside of the netting 8, the clips 11 being positioned so as to snap over the top ring 9 at 90° positions about the top ring.

The lower edge of the plastic netting 8 is secured to an outer base ring 12 that is secured or positioned adjacent the outer side of the base ring 1.

In operative use, in order to errect an insect excluding enclosure, the singular post comprised of adjustably telescopic pipe 6 is moved from the position as shown in FIG. 3 so that the pipe extends vertically upwardly when the base ring is positioned adjacent the ground.

The top ring 9 is then secured to the upper end of the pipe 6 by inserting the steel plug 10 into the upper end of the pipe 6. Thus the top ring is now in a horizontal position so that the netting 8 can now be draped there across and the clips 11 are secured to the top ring.

The lower edge of the netting 8 is then brought down around the side of the bug house by positioning the outer base ring 12 adjacent the outer side of of the base ring 1.

The netting may be made into a taut condition by simply adjusting the pipe sections 6 telescopically.

Thus there is provided a bug house for out of door use and which will prevent insects from entering thereinto.

What I now claim is:

1. In a bug house, the combination of an insect excluding enclosure comprised of a supporting frame work and a plastic netting supported upon said frame work, said frame work being readily collapsable so as to be conveniently and easily stored or transported, said frame work comprising a circular base ring, a circular top ring, said top ring being supported at the upper end of a vertically adjustable telescopic steel pipe which at its lower end is secured to a tee configurated bushing that is pivotal about said base ring, said top ring being provided with a singular vertically extending steel plug that is receivable into the upper end of said adjustably telescopic vertically extending steel pipe, said netting being comprised of a plastic mesh, a lower edge of said plastic mesh being attached to an outer base ring which is adaptable for being positioned around the outer periphery of said base ring, an upper portion of said plastic netting being provided with a plurality of four clips which are snappingly engagbble upon said top ring, said clips being spaced equally apart, and a pair of diametrically spaced apart tie down spikes being adaptable for securing said base ring to a ground, the upper end of each of said tie down spikes having a semi circular hook for being fitted over the upper side of said base ring.

* * * * *